April 1, 1958
H. L. BENNETT
2,828,624
TRUCK DYNAMOMETERS
Filed Dec. 16, 1950
6 Sheets-Sheet 3
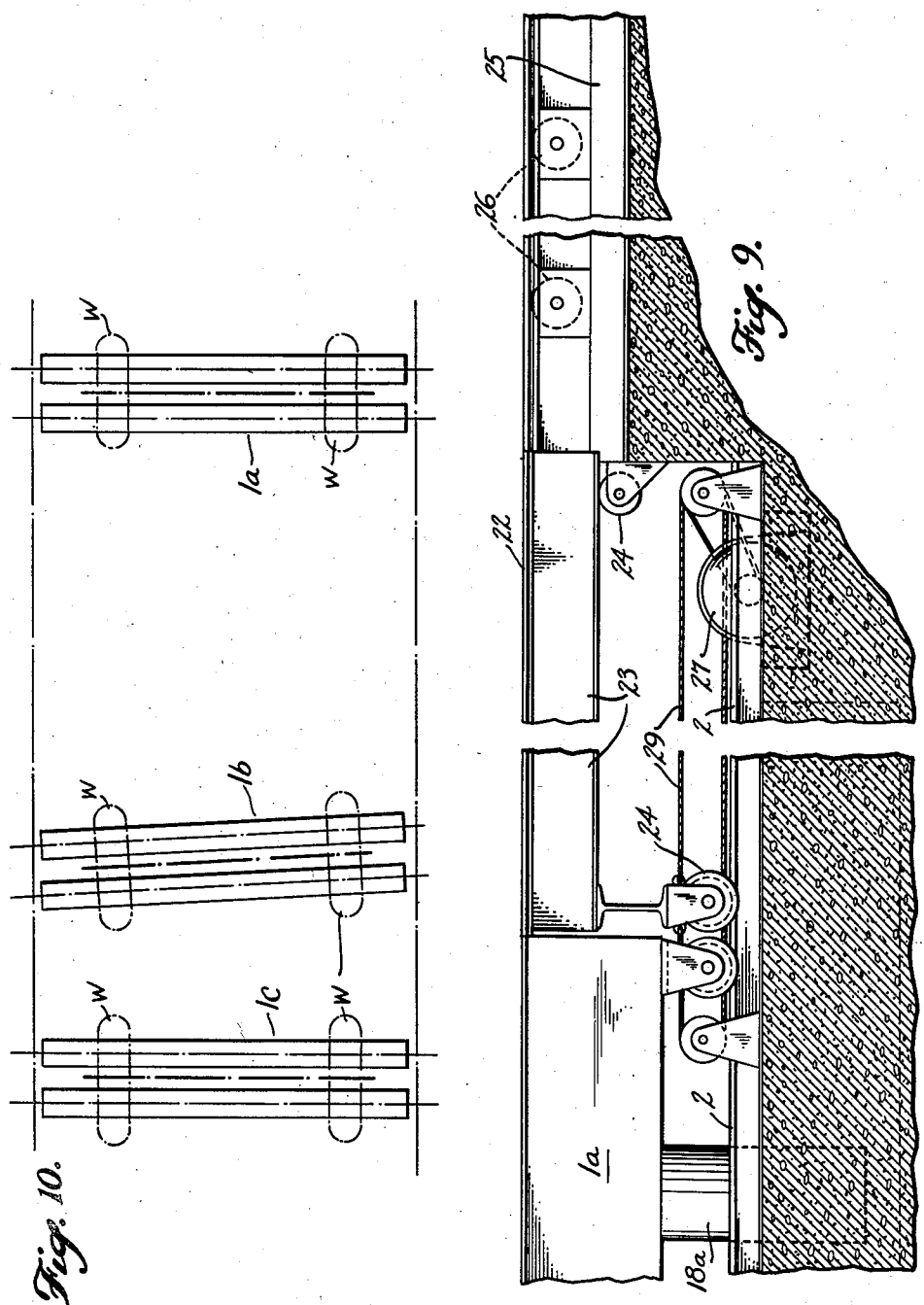
INVENTOR.
HAROLD L. BENNETT
BY
Reynolds, Beach & Christensen
ATTORNEYS April 1, 1958  H. L. BENNETT  2,828,624
TRUCK DYNAMOMETERS
Filed Dec. 16, 1950  6 Sheets-Sheet 4
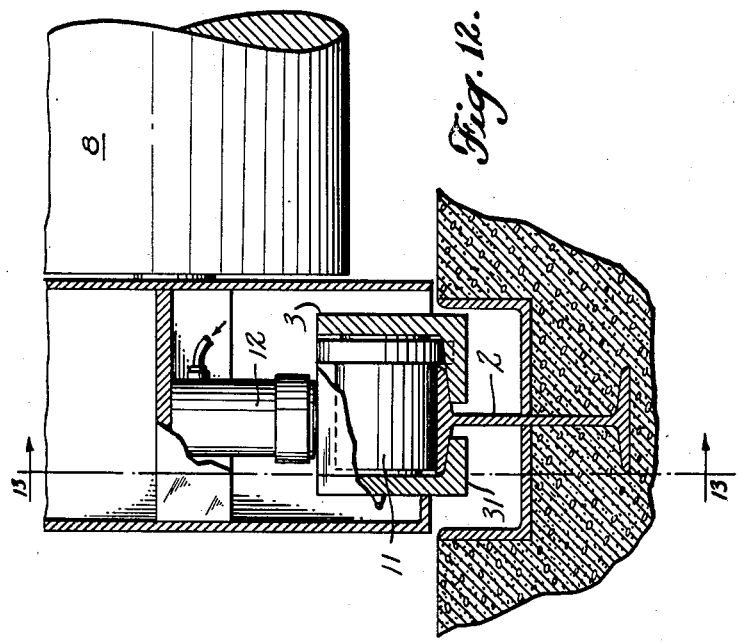
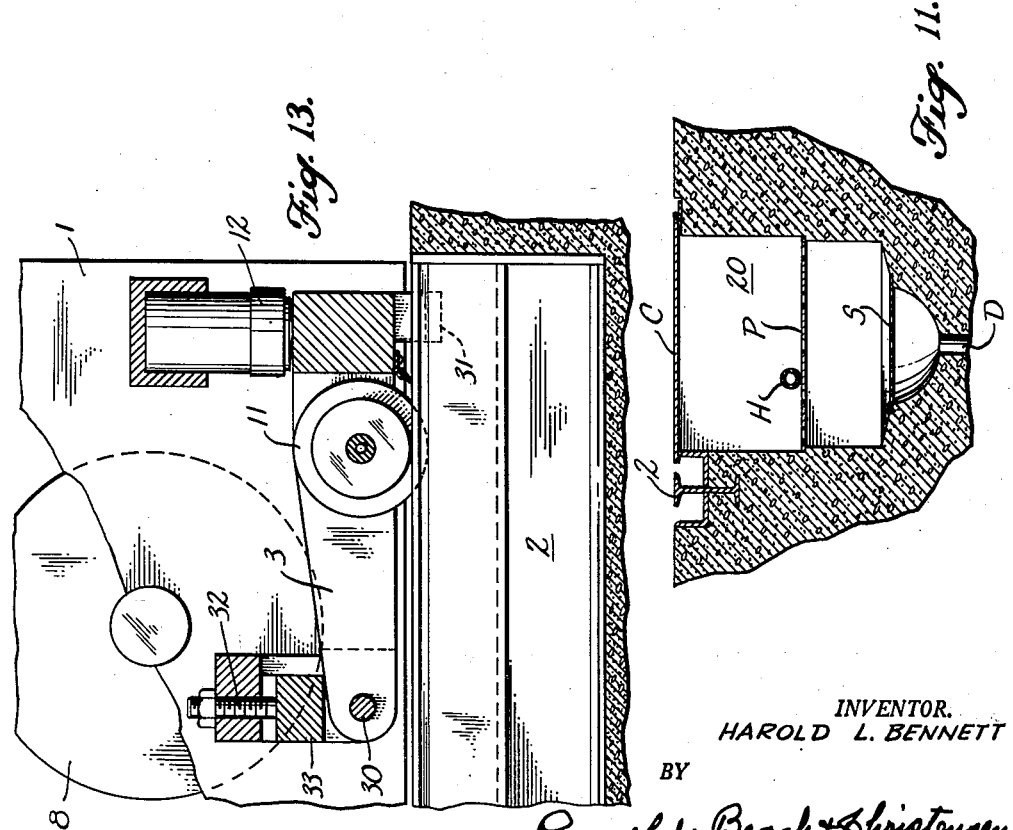
INVENTOR.
HAROLD L. BENNETT
BY
Reynolds, Beach & Christensen
ATTORNEYS INVENTOR.
HAROLD L. BENNETT
BY
Reynolds, Beach & Christensen
ATTORNEYS April 1, 1958 H. L. BENNETT 2,828,624
TRUCK DYNAMOMETERS
Filed Dec. 16, 1950 6 Sheets-Sheet 6
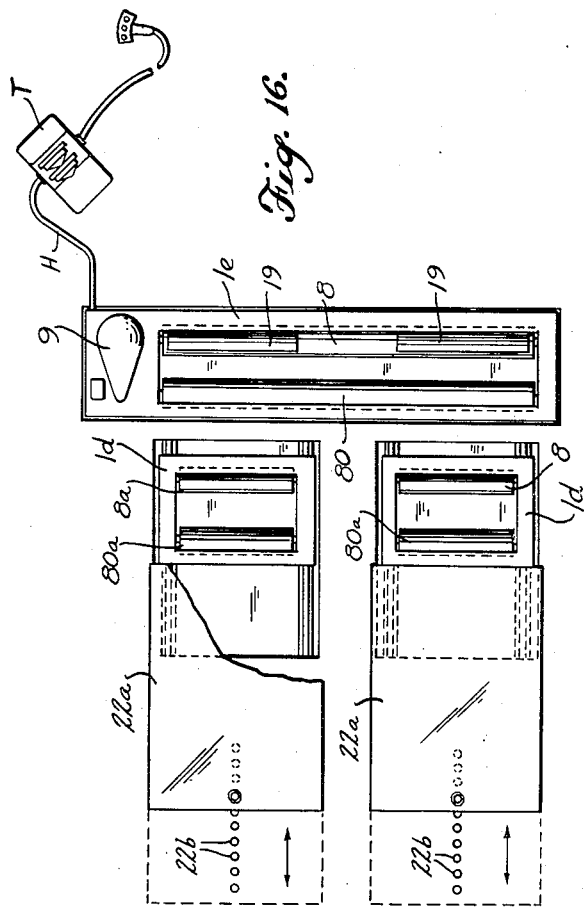
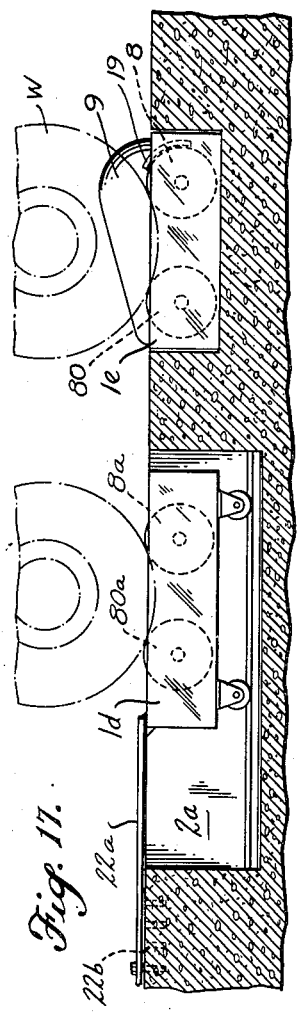
INVENTOR.
HAROLD L. BENNETT
BY
Reynolds, Beach & Christensen
ATTORNEYS

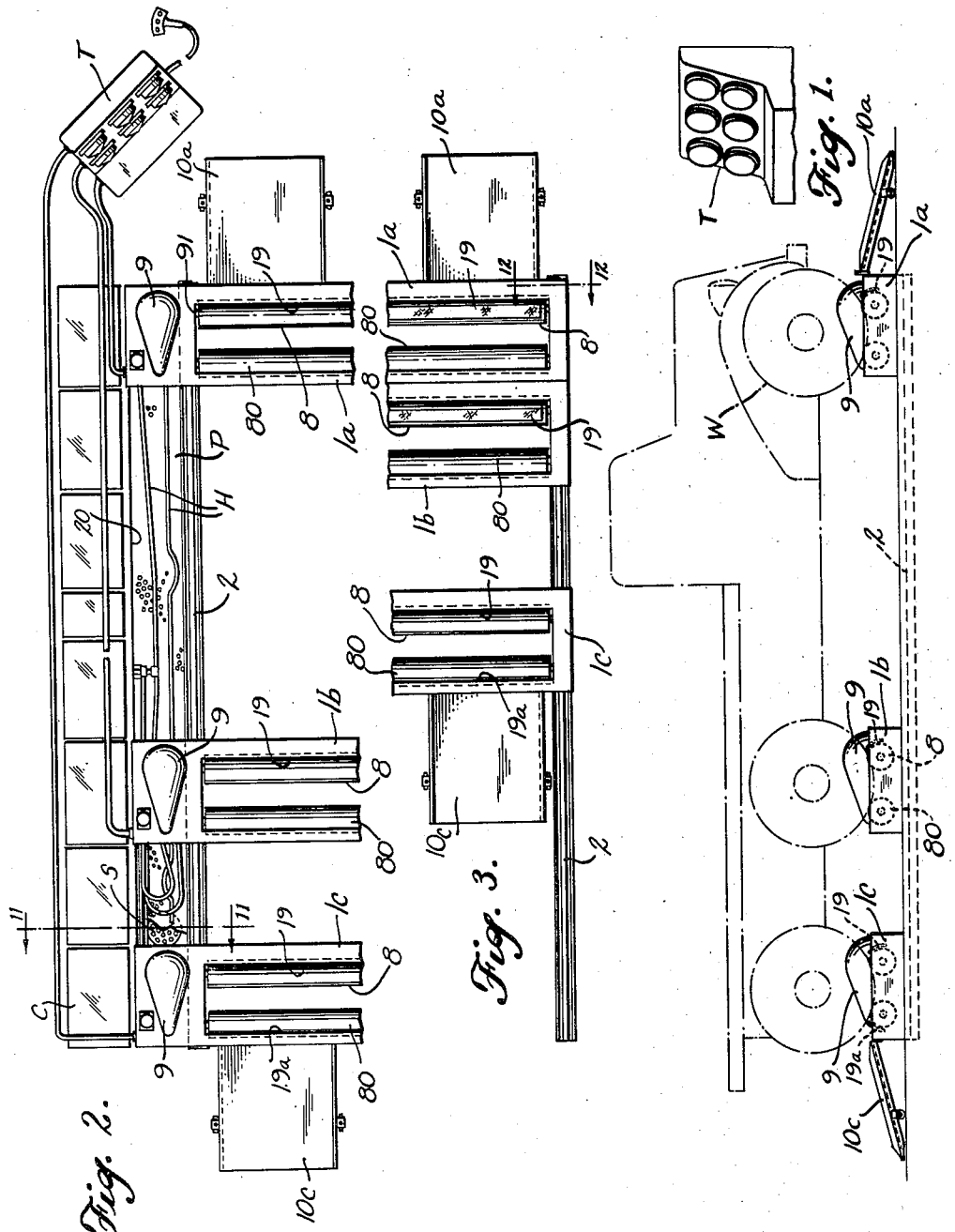

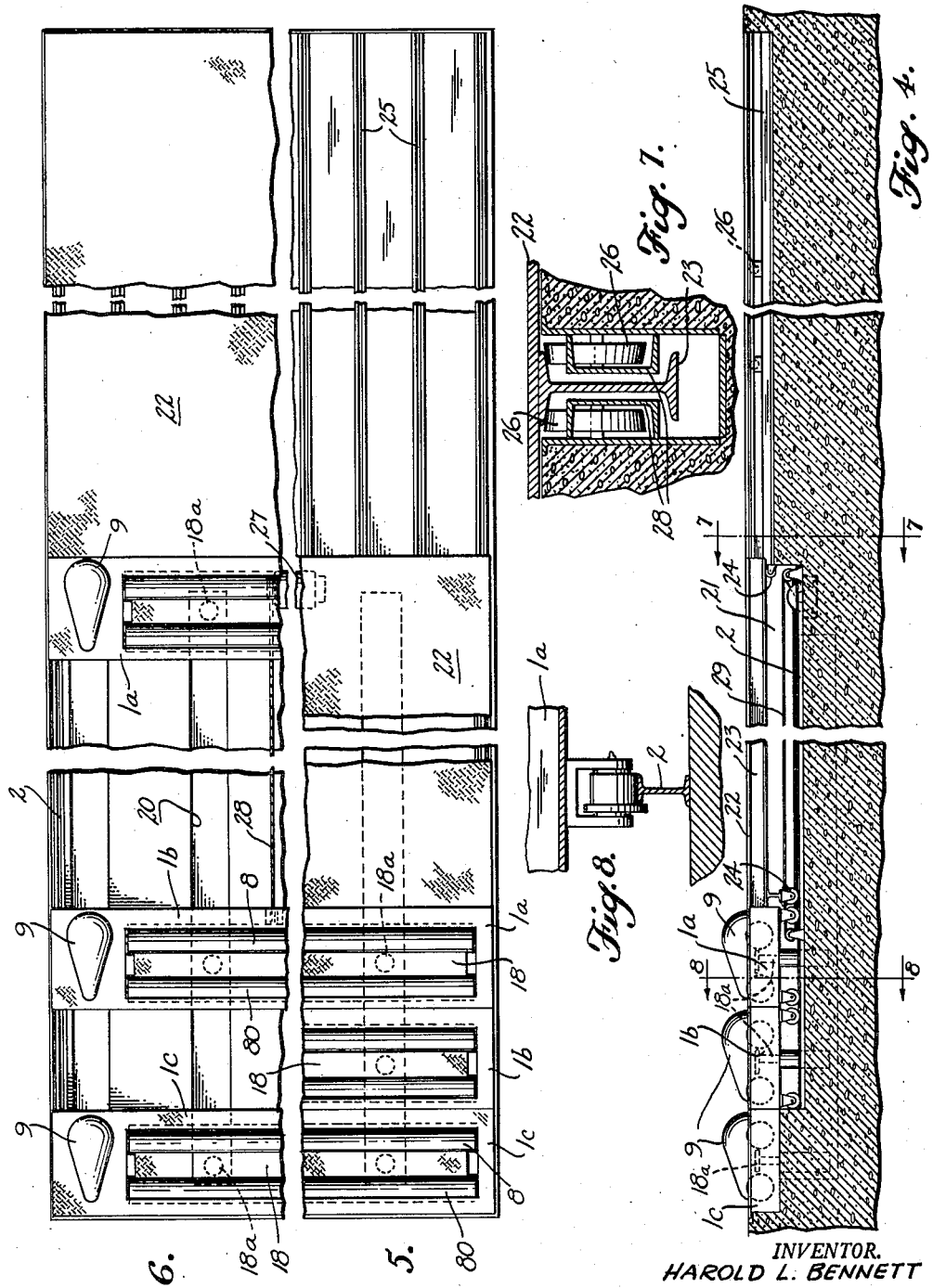

United States Patent Office 2,828,624
Patented Apr. 1, 1958

2,828,624

TRUCK DYNAMOMETERS

Harold L. Bennett, South Bend, Ind., assignor, by mesne assignments, to Clayton Manufacturing Company, El Monte, Calif., a corporation Application December 16, 1950, Serial No. 201,206

13 Claims. (Cl. 73—117)

Chassis dynamometers, usually of the hydraulic resistance type, for the purpose of testing the power delivered to the rear axle of an automobile, are well known and rather widely used. They consist essentially of a pair of rolls, spaced apart sufficiently to cradle the wheels on the rear or driving axle, and of an effective length sufficient to support both such driving wheels on the common axle, together with a hydraulic resistance or power absorption device to absorb and determine the power delivered at such driving wheels, and means to indicate a power factor as thus determined.

The greater weight, and often the need to distribute the tractive effort, of large trucks and buses requires that they be supported at the rear end on tandem axles. This style of mount, wherein tandem axles support and distribute the load, is frequently termed a bogie mount. As to the driving arrangement, usually both bogie-mounted axles are live or driven axles, although occasionally only the forward bogie axle is driven, and the rear one is a dead axle, serving only to distribute the load. In some such vehicles the front wheels are also driven. Vehicles are denominated 6 x 4 if carried upon six wheels, of which four are driven, or 6 x 6, or 6 x 2, or 4 x 2, 4 x 4, etc., as the case may be, and will hereinafter be referred to by such nomenclature. Further as to mounts wherein the two bogie axles are driven, normally both axles are independently connected for driving to the vehicle's drive shaft, but in certain models the drive shaft connects to the two bogie axles through a power divider common to both axles, which is in the nature of a differential as between the two axles, each of which still has the normal differential between its opposite wheels.

In order to test the power delivered at the several driving wheels of a bogie-mounted vehicle, by hydraulic dynamometer means or the like, provision must be made for cradling and absorbing the power from all the driving wheels simultaneously. The provision of dynamometer means for so doing is the pincipal and general object of this invention.

One of the difficulties in providing such a truck dynamometer is that the spacing between the two bogie axles is not uniform in all models or makes, nor is the spacing between live front axles and a live rear axle or axles uniform, and consequently, unless a dynamometer is to be built especially for each type of axle spacing (which is uneconomical and otherwise unsatisfactory) such a dynamometer must be adjustable, and preferably self-adjusting, for each individual axle spacing, and preferably should also be adapted to test a 6 x 6 as well as a 6 x 4 or 6 x 2, and indeed, likewise a 4 x 4 or a 4 x 2. The provision of dynamometer means having such capability of adjustment and flexibility of accommodation is a further object of this invention.

Even though individual dynamometer mechanisms for the respective axles may be adjustable, it is highly desirable that they be self-adjusting to the precise spacing which happens to exist, and in this connection it may be pointed out that the axles of a given vehicle, even though nominally of the same spacing as in some other vehicle, will actually differ by slight amounts, or one axle may be somewhat skewed with respect to a companion axle, and consequently it is an object of this invention to provide dynamometer means for bogie-mounted vehicles and the like, in which the individual dynamometer mechanisms and their mounts are so supported and self-adjusting as to accommodate these individual departures from uniformity, and to conform accurately to the actual position and spacing of the individual axles.

It is preferable that each axle be provided with its individual dynamometer mechanism so that differences between the power delivered at the individual axles may be ascertained, so that the size of the necessarily rather large dynamometers may be kept within reasonable limits, and so that differences between individual axles may be determined, and the provision of dynamometer means so arranged and split into coordinated individual units is one of the objects of this invention. At the same time it is feasible, at least theoretically, to deliver the power from the several live axles to a single dynamometer mechanism, and to determine from this by a single reading the total power developed and delivered, and this is not outside the intended scope of this invention, except as otherwise indicated in the context.

Although the provision of individual and independent dynamometer mechanisms, one for each live axle, is preferred, the principle of adaptability to the maximum number of different vehicles and models requires that such dynamometer mechanism be adaptable, preferably, to the testing of that type of vehicle the bogie axles whereof are connected through a power divider. Accordingly, it is a further object of this invention to provide in such dynamometer means for the coupling together, whenever required for the testing of such a power divider equipped vehicle, of the two individual and otherwise independent dynamometer mechanisms which test the power delivered by the respective bogie axles.

It is an object to provide such dynamometer means which are suited for installation either upon the floor of a garage or similar building, or for building into a pit below such floor, and in the latter case, it is an object to provide means which at least semiautomatically covers and uncovers a pit as the vehicle is driven onto or from the dynamometer means.

Although it is desirable that the several dynamometer mechanisms and their supporting frames be individually self-adjusting to the correct position and spacing between the axles to be tested prior to the commencement of the test, it is desirable also that once so adjusted to proper position, the several dynamometer mechanisms and their supporting frames be locked in their adjusted position, and it is an object of this invention to provide mechanism which will so lock the parts in position, and which preferably will utilize the weight of the truck being tested to assure the retention of the dynamometer mechanisms in their proper positions, once adjusted in such positions.

With these and similar objects in mind, as will appear hereinafter, the present invention comprises the novel truck dynamometer as a whole, the several individual forms thereof, and the novel combination and arrangement of the parts thereof, as well as certain individual parts or mechanisms, all as are shown in the accompanying drawings, and as will be more fully described and claimed hereinafter.

Figure 1 is a general side elevational view of a dynamometer means such as is suited for installation with a minimum of disturbance of the floor of a garage, and such as is capable of testing the power of a 6 x 6 truck or the like, or alternatively, of a 6 x 4 or even a 6 x 2.

Figure 2 is a partial plan view of the same in the position corresponding to that of the parts in Figure 1, while Figure 3 is a similar partial plan view of the opposite side of the dynamometer means, showing parts in a position they would occupy during the time the vehicle is in process of being driven off by its front wheels.

Figure 4 is a sectional view corresponding generally to Figure 1, but illustrating a pit-mounted installation; Figure 5 is a partial plan view of one side of such a dynamometer means with parts all collected at one end to receive an oncoming vehicle, in the same position as that shown in Figure 4, and Figure 6 is a similar partial plan view of the opposite side of the same dynamometer means, shown with the individual dynamometer mechanisms and their frames spread apart, as they would be when a 6 x 4 or 6 x 6 vehicle is in place thereon.

Figures 7 and 8 are detail transverse sectional views along the respective lines 7—7 and 8—8 of Figure 4.

Figure 9 is an enlarged longitudinal sectional view corresponding generally to Figure 4, and illustrating more particularly the mechanism for controlling, supporting and moving the pit covering plate of the dynamometer shown in Figures 4 to 8, inclusive.

Figure 10 is a diagrammatic view representing exaggeratedly the manner in which such dynamometer mechanism is self-accommodating to departures from uniformity in the positioning or spacing of the several axles of a vehicle being tested.

Figure 11 is a transverse sectional view along the line indicated generally at 11—11 of Figure 2, illustrating the drain pit and the trench for the reception of hoses, cables, and the like, suited to any form of installation, but particularly referring to the form shown in Figures 1 to 3, inclusive.

Figure 12 is a transverse sectional view through one side of the dynamometer mounting frame, substantially as indicated at 12—12 of Figure 3, illustrating particularly the gripping means by which the frame may be held in any position after self-adjustment into such position. Figure 13 is a companion view, the line of section being indicated at 13—13 of Figure 12, further illustrating details of the locking or gripping means.

Figure 14:
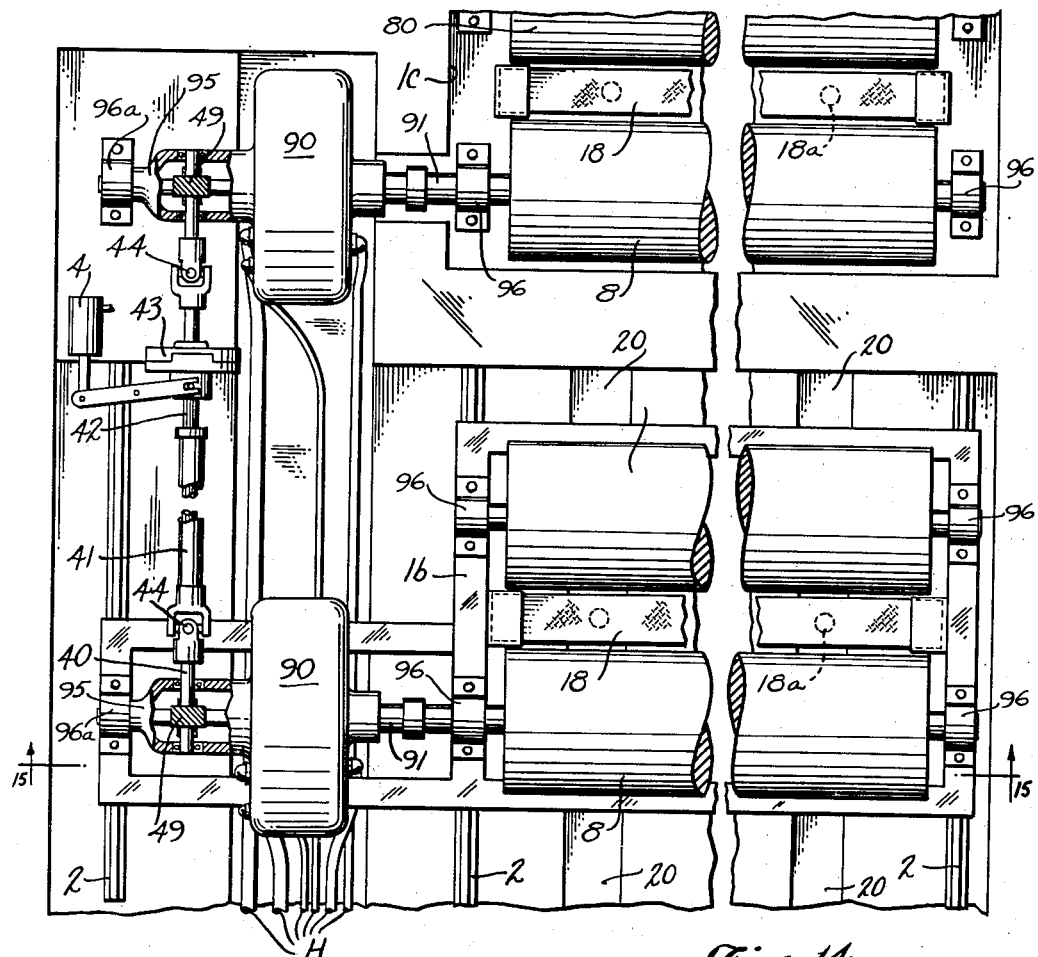
Figure 15:
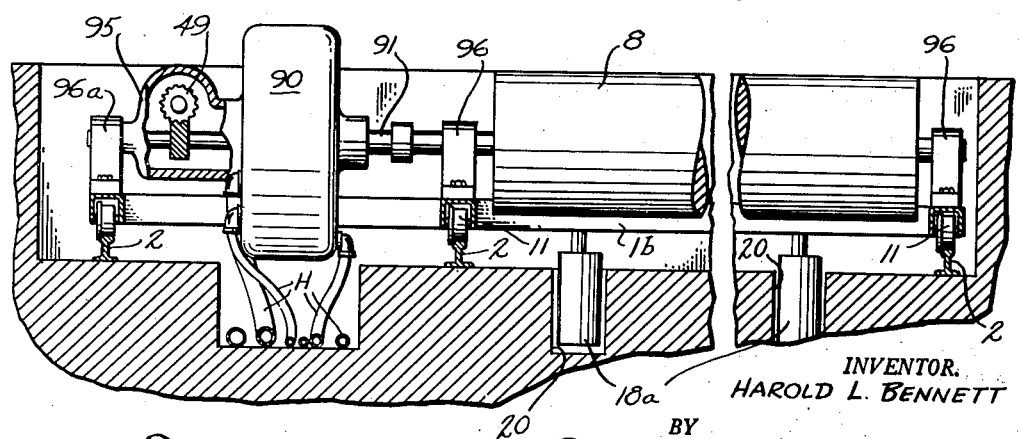

Figure 14 is a plan view of dynamometer means particularly adapted to the testing of bogie axles such as are connected by a power divider, and Figure 15 is a transverse sectional view through one of the dynamometer mechanisms thereof, the viewpoint being generally indicated by the line 15—15 of Figure 14.

Figure 16 is a plan view of a very simple and inexpensive form of the mechanism, such as is adapted for the testing of a 6 x 4 vehicle. Figure 17 is a longitudinal sectional or side elevational view of the same, similar to Figure 4.

Dynamometers of the Froude or hydraulic resistance type are well known, as are also chassis dynamometers for testing 4 x 2 vehicles, and no description of the internal construction of, nor the controls for or indicators of, such a dynamometer appear to be needed. Any such dynamometer means may be used herein, as may be suitable. In general, the dynamometer housed at 9 includes a housing or stator 90 which is mounted to tilt or rock about the axis of its internal rotor (not shown), which rotor is carried on and rotated by the shaft 91 (see for example Figures 14 and 15). Rolls 8 and 80 are supported in parallel relationship, spaced apart sufficiently to cradle an individual wheel W of the truck to be tested, and one of those rolls, usually the forward or drive roll 8, is connected to the dynamometer shaft 91 to drive the same while the other roll 80 runs idle. These two rolls are likewise of an effective length, whether actually continuous or divided into two sections, to support the opposite wheels on any given axle of the truck. Where dual wheels are employed, it is preferable that the rolls 8 and 80 be of sufficient length to support all such wheels which are on an axle. The two rolls 8 and 80 of a pair or set are journaled for free rotation within an elongated rectangular frame 1a, 1b or 1c. These frames are substantially alike, and have long sides and relatively short ends, although some of the frames may be fixed, or in the form shown in Figures 4, 5 and 6, for example, the rear frame 1c is secured fixedly in the floor and is immovable, while the other two frames 1b and 1a are mounted for movement in a direction longitudinally of the truck to be tested.

The provision for such longitudinal movement may vary with the style of installation preferred, and, for example, in the form shown in Figures 1, 2 and 3, the several frames are roller-mounted on rollers 11 (see Figures 12 and 13) and stand in effect upon the floor, being supported, however, upon rails 2, which are supported upon or are inset into the floor, and in such an installation the forward frame 1a would be provided with a run-off ramp 10a, and the rear frame 1c would be similarly provided with a run-off ramp 10c. For convenience of handling the control cables, conduits, and the like, which must at all times connect to the individual dynamometers, notwithstanding that they shift with their frames from one position to another, it is preferred to provide (see Figure 11) a trench 20 alongside the path of one end of the movable frames, this being preferably provided with a drain D, a strainer S and a separator plate P, whereby the hoses or conduits H may be supported out of contact with drain water and the like. The whole is covered over, when access is not required, by deck plates or covers C, which in Figure 2 are shown swung back to uncover the trench 20.

In the type of installation shown in Figures 4, 5 and 6, the rails 2 are sunk below the floor level within a pit 21, but otherwise the construction is quite similar to that already described. However, because of the presence of the pit and the desirability of covering it over when no vehicle is on the dynamometer means, a diamond floor plate or the like, indicated at 22, is provided. It is stiffened by I-beams 23 or the like, which are supported upon rollers 24 (see Figure 4), so that the floor plate may be run out over the pit and the trenches 20 and 21, as in Figures 5 and 9, or it may be pushed ahead of the advancing frame 1a, merely to overlie the floor, as in Figure 6. While in the latter position its stiffener ribs 23 are received in channels 25 inset below the floor and supported by rollers 26 (see Figure 7), and channels 28 overlie the lower flanges of the I-beams 23, to insure that the floor plate 22 cannot be curled or lifted up.

It will be clear that the cover plate 22 can be moved in one direction by the advancing frame 1a, but it is preferred that the two be not positively connected. Hence means must be provided for restoring the floor plate, after retraction of the frame 1a, to pit-covering position, and this can be accomplished by the mechanism shown in Figure 9, consisting, for example, of an electric motor 27 installed in the pit and connected to the pit cover 22, 23 by cable means indicated at 29.

In Figure 5 the three frames and their dynamometer mechanisms are collected side by side all at the run-on end of the dynamometer means. In this position, with slight restraint of the leading frame 1a, the front wheels of a vehicle entering from the left towards the right, under the thrust of rear driving wheels having traction on the floor, will roll over the rolls of the frames 1c and 1b and will be cradled in the rolls 8 and 80 of the frame 1a. Upon release of restraint this frame 1a, being mounted upon the rollers 11, will roll forwardly along the rails 2 under the thrust of the rear driving wheels of the entering vehicle, which still have traction on the floor. The forward axle of the bogie mount will next encounter the fixed frame 1c and its roller, will ride over them under the thrust of the rearmost wheels, and will cradle itself between the rolls 8 and 80 of the frame 1b, and, this frame being similarly roller-mounted, will move ahead, until finally the rear wheels of the bogie mount will cradle themselves in the rolls 8 and 80 of the fixed frame 1c. Since there is no longer any fixed reaction point or traction, the vehicle will cease to move forwardly, and continued rotation of the driving wheels will merely serve to rotate the rolls in which these wheels are cradled. If the truck is a 6 x 6, its wheels will drive all the paired dynamometer rolls, and each dynamometer at 9 will register the power delivered by that particular axle, and this will be communicated to instruments in a test stand T (see Figures 1 and 2) to indicate a power factor developed at each such dynamometer in known manner. A 6 x 4 vehicle, a 4 x 4, or a 6 x 2, will similarly drive the appropriate rolls, and those not driven will remain stationary, and will not affect the result. After the various appropriate tests have been concluded, the vehicle may be driven off the test stand.

The manner of driving off the stand depends on the nature of the particular installation, on which wheels, or how many axles, are driven, and on the provisions that may be made for affording traction to previously cradled wheels. Traction may be afforded wheels by a wheel lift platform 18 of the type shown in my application Serial No. 610,551, filed August 13, 1945, now Patent No. 2,583,201, powered by jack cylinders 18a; a roll shield 19 may be provided, of the type shown in my Patent No. 2,397,461, issued April 2, 1946; or some type of roll brake or lock of known type may be used. In an installation of the type shown in Figures 1, 2, and 3, by covering the forward roll of the forward set, in frame 1a, with a roll shield 19 upon completion of a test, the vehicle can obviously be driven off forwardly if its front wheels are driven without locking the frame 1a to the rails 2; meanwhile the rear driving wheels merely idle in their roll cradles until their frames 1b and 1c come forwardly into contact with, respectively, the frame 1a and the stopped frame 1b, after which the forward roll of each pair, as its frame is halted, is shielded to afford traction and its frame obviously need not be locked to the rails 2, or dependence is placed upon the tractive pull of the forward driving wheels, or of those plus the front bogie wheels, to pull off the rear wheels until they acquire traction on the ramps 10a or the floor. If the vehicle has not driven front wheels, being for example a 6 x 4, it may obviously back off by covering the rear roll 80 with a roll shield 19a without locking the frame 1c to the rails 2, utilizing now the tractive effect of the rear bogie wheels, and collecting the frames 1b and 1a towards the rear frame 1c.

Mention has been made of the necessity for restraining movement of individual frames during driving on of a vehicle, and perhaps in driving off. Likewise, it is desirable that the frames, once properly positioned to support a given vehicle, be fixed in such position during a test. As a convenient means to such ends the frames are mounted on rollers 11 in such manner that the roller support may at will be removed or restored; when removed from any given frame that frame rests solidly on the floor or other immovable support; when restored, the frame is free to shift to cradle the wheels at each end of the supported axle equally between the two rolls 8 and 80, even if this involves some skewing of the frame.

To attain such ends the rollers 11 that support the dynamometer mounting frame are preferably indirectly connected to the frame. As is best shown in Figures 12 and 13, such rollers 11 are mounted upon levers 3, which are pivotally mounted at 30 to the frame 1, and at the end of the lever opposite the pivotal mounting at 30 each lever is provided with rail gripping means 31, which underhang the top flange of the rail 2. The lever 3 is arranged to tilt about the axis of the roller 11 by jack means 12, which is carried on the frame, the plunger whereof bears down upon this end of the lever, and which when it so depresses the grip-carrying end of the lever causes the pivotal mounting at 30 to be elevated. This accomplishes two results. It releases the grip 31 from gripping engagement with the flange of the rail 2, and elevates the frame itself above the rail and floor. However, when the jack means at 12 is contracted, the grip at 31 will tightly grip and engage the flange of the rail 2, and the entire weight of the frame serves, with appreciable mechanical advantage, to tighten the grip, or, in the alternative, to permit the frame 1 to rest solidly on the floor or upon the rail itself, and thus to lock the frame in any attained position. The gripping action may be adjusted by treading in or out the bolt at 32, the clevis 33 whereof carries the pivotal mounting at 30 for vertical adjustment with respect to the frame 1.

So long as the frames 1 are roller-borne, they will roll freely and accommodate themselves automatically to variations in the spacing between the truck's axles. Moreover, the rollers 11 do not so closely engage the rails 2, nor are parts of the mechanism so rigidly connected, but what any given frame may skew with relation to the rails, as the frame 1b is shown exaggeratedly as doing in Figure 10, to accommodate a skewed front bogie axle (or any other), and to permit the several wheels to rest solidly in the respective roll cradles, equally cradled between the paired rolls 8 and 80.

The arrangement shown in Figures 16 and 17 is an extremely simple one for testing a 6 x 4 vehicle. The rear bogie wheels are received between paired rolls 8a and 80a, mounted in rolling carriages of frames 1d; the front bogie wheels are cradled in rolls 8 and 80 journaled in a fixed frame 1e. Floor plates 22a are fixed to the rear of the rolling frames 1d, but can be locked, and thereby lock the frames 1d, in any given attained position by locking pins or the like indicated at 22b. To drive on from left to right, the frames 1d adjoin the fixed frame 1e, and the unlocked plates 22a cover the pits 2a in which the frames 1d are received. The front bogie wheels ride on the plates 22a and pass over the same and the rolls 80a and 8a, coming to rest in the cradle formed by the rolls 8 and 80. Immediately all remaining traction, that on the rear bogie wheels which now rest on the plates 22a, is exerted to thrust these plates, and the connected frames 1d, rearwardly or to the left. Promptly the frames 1d shift to a point where the rear bogie wheels drop between the rolls 80a and 8a. No tractive thrust remains, and movement of the frames 1d ceases. The driven front bogie wheels rotate the rolls 8 and 80 and the corresponding dynamometer mechanism 9; the driven rear bogie wheels spin the rolls 8a and 80a, with minimum friction loss, and the power determination by the dynamometer mechanism at 9 is considered in many cases, sufficiently informative. Roll shields 19a when brought into roll-shielding position enable the process to be reversed, for backing off. This arrangement is particularly good as a means for self-adjustment to position, and accurate cradling, of the opposite rear bogie wheels.

The bogie mounts of certain makes or models of trucks differ from more conventional models in that the two axles of a given bogie are connected to the propeller shaft through a power divider which is in the nature of a third differential, so that the two axles may turn at slightly different rates in rounding a curve. It becomes necessary, when testing such a vehicle, to lock together the two dynamometers and their roll sets for conjoint rotation, as otherwise one would receive all or an abnormal part of the power, and the other little or none, and normal conditions would be absent. An arrangement to this end is shown in Figures 14 and 15. Here the dynamometer housing at 90 is extended at 95 to constitute a gear housing, and the journal bearings 96 that support the live roll 8 are supplemented by a bearing 96a which supports the outboard end of the gear housing 95, so that in effect the dynamometer housing and the roll which drives the dynamometer are mounted unitarily to tilt about a common axis. In this way the torque on the dynamometer housing represents 100% of the total torque delivered, and none is lost otherwise, and hence is not measured, in the gearing. This arrangement might be adopted in any of the dynamometer mechanisms, save that the gear housing is only required where it becomes necessary to couple together two companion dynamometer mechanisms.

Within these gear housings 95 are intermeshed gears represented at 49, one on the shaft 91 and another on the stub shaft 40, journaled within the gear housing 95. Intermediate the two companion dynamometers extends a shaft formed in two parts, 41 and 42, which are in splined axially slidable interconnection one with another, and the section 42 is divided again and formed with a clutch or similar coupling 43. Universal couplings 44 complete the arrangement, together with control means 4 whereby the clutch 43 may be coupled or uncoupled at will. By such an arrangement, upon engagement of the clutch at 43 under the control 4, the two roll sets of the frames 1b and 1c may be coupled together for conjoint rotation, and thus each dynamometer will absorb the power, and all of it, as normally delivered from each of a pair of bogie axles that are connected through a power divider. At other times, when a conventional drive is employed, without a power divider, by uncoupling the shafts at 43 the two roll sets are equally available for handling independently driven bogie axles, and the power absorbed in the gearing is still impressed to create torque about the dynamometer's axis, tending to rotate the housing thereof, hence measurable conjointly with the hydraulically produced torque which tends to rotate the same housing.

I claim as my invention:

1. Apparatus for testing vehicles, comprising: a pair of guide rails; a plurality of chassis dynamometer units, each of said units comprising an elongated rectangular frame having long sides and relatively short ends, a set of road wheel-engaging rolls including a drive roll and a driven roll rotatably supported by each frame in a common substantially horizontal plane, and a power absorption device connected with one roll of each set; means supporting said frames for movement bodily on said guide rails, said units being individually movable to be grouped side by side at either end of said guide rails; and means operable to lock said units against movement when desired during mounting of the vehicle thereon, whereby a vehicle to be tested can be driven onto said units at either end of said rails.

2. Apparatus for testing vehicles as defined in claim 1, in which the guide rails are adapted to be floor-mounted, and wherein movable ramp means is provided to assist in loading the vehicle onto the units from either end of the guide rails.

3. Apparatus for testing vehicles as defined in claim 1, in which each movable chassis dynamometer unit includes means utilizing the weight of the vehicle for locking it in any desired position along the guide rails and means for releasing said locking means.

4. Apparatus for testing vehicles as defined in claim 1 in which the locking means for the movable chassis dynamometer units comprises gripping means secured thereto, and hydraulic power operated means arranged to move said gripping means relative to said rails.

5. Apparatus for testing vehicles as defined in claim 1, in which the means supporting the frames for movement bodily on the guide rails comprises rollers, and wherein a lever is mounted for movement about the axis of at least one of said rollers and one end of said lever is pivotally connected with its associated frame and its other end is engageable with one of said rails, and means for turning said lever about its pivot.

6. Apparatus for testing vehicles as defined in claim 5 in which the means for turning the lever about its pivot comprises a hydraulic cylinder arranged to move the rail-engaging end of the lever away from the rail.

7. Mechanism for testing the power of bogie-mounted vehicles in which the forward and rearward line axles of the bogie are connected by a power divider, which comprises: a set of two rolls for cradling the wheels of each bogie axle, each set of rolls comprising an idle roll and a drive roll, the two rolls of each set being disposed in a common substantially horizontal plane and of an effective length and spaced apart sufficiently to cradle between them the wheels at the opposite ends of a given axle, and to be rotated as the cradled wheels are driven; a frame for each set of rolls, each of said frames being rectangular and having long parallel sides and relatively short ends; dynamometer mechanism operatively connected to one roll of each set of rolls, to be driven thereby and thus to absorb and determine the power of the corresponding axle; means journaling one set of rolls in the ends of each frame and mounting the drive roll and its dynamometer mechanism for tilting about the axis common thereto; means operatively connected to said dynamometer mechanism to indicate a power factor as thus determined; roller means carried by at least one frame for automatically effecting adjustment in a direction lengthwise of the oncoming vehicle to be tested, of the position of said one frame relative to another as the bogies are cradled on different sets of rolls to accommodate bogies of varying axle spacings; and means, including flexible couplings and disengageable couplings, for coupling together the two dynamometer mechanisms.

8. Mechanism for testing the power of a bogie-mounted vehicle, which includes: a frame; a pair of spaced rolls journaled thereupon of an effective length to cradle the opposite wheels on an individual bogie axle; dynamometer mechanism operatively connected to a roll of said pair to absorb and determine the power delivered by the so-cradled wheels; a second pair of rolls similarly arranged to cradle the wheels of a companion axle; fixed rails disposed beneath said frame; cooperating rollers carried by said frame and engaged with said rails for guiding the frame for movement in a direction lengthwise of the vehicle to be tested, whereby said two pairs of rolls can be positioned to accommodate differences in spacing between the two axles of any given vehicle to be tested; gripping means carried by the frame in a position to grip a rail and thus to lock the frame to the rail against further movement, said gripping means including a generally horizontally disposed lever, means on the frame pivotally connecting one end of the lever to the frame, a roller mounted on said lever intermediate its ends, and a rail grip carried by the opposite end of said lever, the rail grip being arranged to be urged into gripping engagement with the rail by the weight of the frame acting on the pivoted end of the lever; and power-operated means carried by the frame and operatively engaged with the lever to urge the lever to a position in which the rail grip is out of gripping engagement with a rail and the frame is supported on the roller for movement along the rails.

9. Mechanism as defined in claim 8, including further, means to shift upwardly or downwardly, relative to the frame, the point of pivotal support for the pivoted end of the lever.

10. Apparatus for testing the power of bogie-mounted vehicles, comprising: two frames and a set of rolls rotatably mounted in each frame for cradling a forward and rearward live axle of a bogie, each set of rolls comprising an idle and a drive roll; a dynamometer mechanism operatively connected coaxially with the drive roll of each set; journal means on each frame mounting each dynamometer mechanism and its drive roll for tilting movement about the axis common thereto; means drivingly connecting together the two tiltable dynamometer mechanisms and their associated driven rolls, said means including flexible couplings and telescoping shaft sections and a clutch device connected in one of the shaft sections.

11. Mechanism for testing the power of bogie-mounted vehicles, which comprises: three sets of two rolls each, lying in a common horizontal plane, each set having its two rolls of sufficient effective length, and spaced apart sufficiently, to cradle between them the wheels at opposite ends of a given axle, and to be rotated as the cradled wheels are driven; a frame individual to each set of rolls, wherein the latter are journaled, each of said frames having end and side members, all of said frame members having upper surfaces lying in a common substantially horizontal plane, one frame being fixedly supported; rails extending from said one frame in a direction lengthwise of the vehicle to be supported, said rails being mounted within a pit below floor level, the three frames being mounted in said pit so that their rolls support the cradled wheels approximately at floor level; rollers on the other two frames movable along said rails for enabling adjacent frames to have their side members initially placed in abutting engagement at one end of said pit when desired and for automatically effecting adjustment of the spacing of such roller-mounted frames relative to each other and to said one fixed frame as an oncoming vehicle is being mounted upon the rolls of said frames; means operable to restrain movement of said roller mounted frames when desired during mounting of the vehicle thereon; a platform to cover the pit when the three frames are initially collected at one end of the pit, to receive a vehicle; means interengageable between said platform and the leading frame, as a vehicle rolls on, to move the platform ahead of the leading frame, and so to uncover the pit, as the leading frame advances under the thrust of the oncoming vehicle; dynamometer mechanism mounted on at least the fixed frame and the next adjacent frame, and operatively connected to a roll of each thereof; and indicating means operatively connected to said dynamometer mechanism.

12. Power testing mechanism as defined in claim 11, including means for restoring the platform to pit-covering position; and longitudinal guide means interengageable between the platform and the floor, to guide the uncovering and pit-covering movements of the platform.

13. Power testing mechanism as defined in claim 11, including further, power operated means engaged with the platform, and operative, upon return of the leading frame towards its initial position, to restore the platform to its pit-covering position.

References Cited in the file of this patent

UNITED STATES PATENTS

| 1,155,126 | Bond | Sept. 28, 1915 |
| 1,918,063 | Starr | July 11, 1933 |
| 1,918,219 | Twyman | July 11, 1933 |
| 1,966,603 | Walker | July 17, 1934 |
| 1,985,515 | Norton | Dec. 25, 1934 |
| 2,130,833 | Bennett | Sept. 20, 1938 |

FOREIGN PATENTS

| 506,587 | Germany | Sept. 5, 1930 |
| 603,714 | Germany | Oct. 8, 1934 |
| 548,128 | Great Britain | Sept. 25, 1942 |